United States Patent [19]

Igarashi et al.

[11] 4,341,403
[45] Jul. 27, 1982

[54] FLUORAN COMPOUNDS, PROCESS FOR PREPARATION THEREOF, AND RECORDING SHEETS USING SAME

[75] Inventors: Akira Igarashi, Fujinomiya; Kozo Sato; Ken Iwakura, both of Minami-ashigara, all of Japan

[73] Assignee: Fuji Photo Film Co., Ltd., Kanagawa, Japan

[21] Appl. No.: 141,527

[22] Filed: Apr. 18, 1980

[30] Foreign Application Priority Data

Apr. 24, 1979 [JP] Japan .................................. 54-51270
Jan. 31, 1980 [JP] Japan .................................. 55-10467

[51] Int. Cl.³ .......................... B41M 5/18; B41M 5/22
[52] U.S. Cl. ............................ 282/27.5; 428/320.6; 428/411; 428/488; 428/913; 428/914; 427/151; 430/338; 549/226; 428/537
[58] Field of Search ................ 430/338, 340; 428/411, 428/913, 914, 207, 537, 320.6; 106/21; 252/500; 346/135.1; 260/343.3 R; 282/27.5; 427/150, 151, 261

[56] References Cited

U.S. PATENT DOCUMENTS 3,959,571 5/1976 Yahagi et al. .................. 282/27.5
4,226,912 10/1980 Iwasaki et al. .................. 282/27.5

FOREIGN PATENT DOCUMENTS 1297596 11/1972 United Kingdom .............. 282/27.5

Primary Examiner—Won H. Louie, Jr.
Attorney, Agent, or Firm—Sughrue, Mion, Zinn, Macpeak & Seas

[57] ABSTRACT

A fluoran compound represented by the formula:

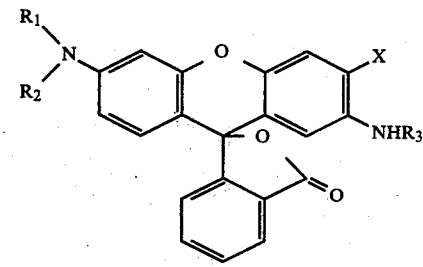

wherein $R_1$ and $R_2$ each represents an alkyl group containing up to 18 carbon atoms, $R_3$ represents an alkyl group, a halogenated alkyl group, or an alkoxyalkyl group containing up to 18 carbon atoms, and X represents a halogen atom, a process for preparing such fluoran compound and a pressure-or heat-sensitive recording sheet comprising such fluoran compound as a color former, which are capable of providing black images having excellent stability, e.g., with respect to light.

4 Claims, No Drawings

FLUORAN COMPOUNDS, PROCESS FOR PREPARATION THEREOF, AND RECORDING SHEETS USING SAME

BACKGROUND OF THE INVENTION

1. Field of the Invention

This invention relates to novel fluoran compositions, to a process for preparing such compounds. Furthermore, the invention relates to pressure- or heat-sensitive recording sheets using such fluoran compounds, which are capable of providing black images having excellent stability, e.g., with respect to light.

The fluoran compounds of the present invention are particularly useful as dye precursors for use in recording materials such as pressure-sensitive recording sheets, heat-sensitive recording sheets, and energizable heat-sensitive recording sheets, and can also be applied to light-sensitive recording sheets, ultrasonic wave-recording sheets, electron beam-recording sheets, electrostatic recording sheets, light-sensitive printing plate materials, stamping materials, type ribbon, ink for ballpoint pen, crayon, and the like.

2. Description of the Prior Art

Recording systems utilizing a coloration reaction caused by contacting an almost colorless electron-donating compound with an almost colorless electron-accepting compound have long been known, particularly systems using pressure-sensitive recording sheets and heat-sensitive recording sheets.

In general, the pressure-sensitive recording sheet comprises a set of sheets: (1) an upper sheet having coated on the support thereof microcapsules prepared by dissolving an electron-donating colorless dye (hereinafter referred to as a color former) in a suitable solvent, emulsifying it into particles of a several-micron size, and encapsulating the droplets with a high molecular weight compound such as gelatin; and (2) a lower sheet comprising a support having coated thereon an electron-accepting compound (hereinafter referred to as a color developer). Recording is achieved by applying writing pressure or impact pressure to the sheets, arranged with the coated sides facing each other; the microcapsules are thereby ruptured, and release and transfer the color former to the color developer-coated surface, thereby causing a coloration reaction. Detailed descriptions of such pressure-sensitive recording sheets are found, for example, in U.S. Pat. Nos. 2,505,470, 2,505,489, 2,550,471, 2,730,457 and 3,418,250.

On the other hand, the most popular type of heat-sensitive recording sheet comprises a support having provided thereon a color former and a color developer carried in a binder so as not to come prematurely into contact with each other. Upon being heated, at least one of the color developer and the color former is melted, and comes into contact with the other, thereby causing a coloration reaction, thus recording color in heated areas of said sheet. Detailed descriptions of such heat-sensitive sheets are found, for example, in Japanese Patent Publication Nos. 4160/68, 3680/69 and in U.S. Pat. No. 2,939,009.

The pressure-sensitive and heat-sensitive recording sheets containing combinations of color former and color developer can provide various colored images, depending on selection of appropriate kinds of color former and color developer. It has recently been desired to prepare pressure- and heat-sensitive recording sheets capable of providing black images, in order that further copies of the recording sheets can be obtained. In principle, a black color image can be obtained by suitably mixing several kinds of color formers forming different colors. However, since the coloration rate and/or fastness against light, temperature, and humidity varies depending upon the particular color former used, the resulting color using such a combination changes after recording with time and/or under certain storage conditions. In addition, the use of many color formers complicates the production steps. Therefore, investigations have been made to obtain a black color image by using a single color former. However, there has not yet been discovered any black color former that is satisfactory in all respects, including hue, fastness, cost, etc. Thus, conventional black color-forming pressure- and heat-sensitive recording sheets have not been totally satisfactory.

Heretofore, known fluoran compounds have been used as dye precursors for use in recording materials in U.S. Pat. Nos. 3,501,331, 4,007,195, 4,024,157 and 3,920,510. However, conventional fluoran compounds have defects in that the compounds are unstable in the atmosphere, and dyes formed therefrom have poor fastness against light, humidity, etc.

SUMMARY OF THE INVENTION

It is therefore an object of the present invention to provide novel fluoran compositions excellent as dye precursors for use in recording materials.

Another object of the present invention is to provide novel processes for preparing fluoran compounds.

A further object of the present invention is to provide a pressure- or heat-sensitive recording sheet capable of forming a pure black color that is excellent in color fastness and more economical than previous systems.

The above-described objects of the present invention can be attained by means of a novel fluoran compound (sometimes referred to herein as a color former, in view of its intended use) represented by the following formula (I)

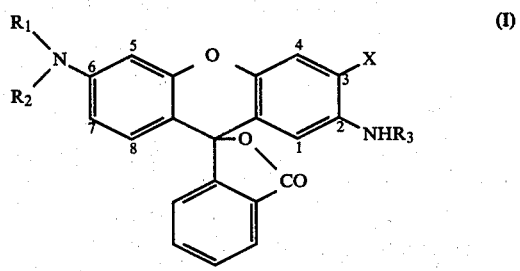

wherein $R_1$ and $R_2$ each represents an alkyl group containing up to 18 carbon atoms, $R_3$ represents an alkyl group, a halogenated alkyl group, or an alkoxyalkyl group containing up to 18 carbon atoms, and X represents a halogen atom.

The novel fluoran derivatives represented by the formula (I), which can be obtained by processes as described below, are colorless or slightly colored powdery compounds stable in the atmosphere; that, when brought into an intimate contact with an electron-accepting material such as active clay, phenol-formalin resin, or bisphenol A, almost instantly form a black color; and that do not suffer deterioration of their color-forming ability during storage due to discoloration or decomposition. Therefore, these fluoran compositions are excellent dye precursors for use in recording materials.

DETAILED DESCRIPTION OF THE INVENTION

The fluoran compound, a color former according to the invention, represented by the general formula (I), can be synthesized by condensing a benzophenone derivative (IV) with an aminophenol derivative (V) in a dehydrating agent such as sulfuric acid, as is shown by the following reaction(A):

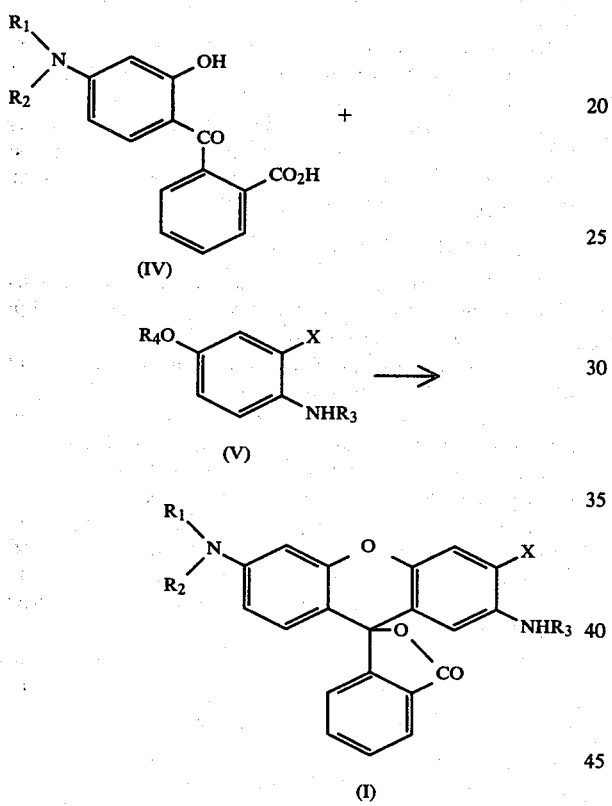

wherein $R_1$, $R_2$, $R_3$, and X are the same as defined previously with respect to the formula (I), and $R_4$ represents a hydrogen atom, a methyl group or an ethyl group.

The benzophenone derivative represented by the general formula (IV) can be synthesized by reacting a corresponding m-dialkylaminophenol with phthalic anhydride in a known manner. Also, the aminophenol derivative represented by the general formula (V) can be obtained by the reaction between 3-halo-4-aminophenol or 2-halo-4-alkoxyaniline and a corresponding alkylating agent such as alkyl bromide or alkyl tosylate.

It has also been discovered that the novel fluoran compounds of the invention (i.e., according to formula (I)) can easily be obtained in even higher yield by an alternative process, comprising reacting a fluoran derivative (II) represented by the following formula

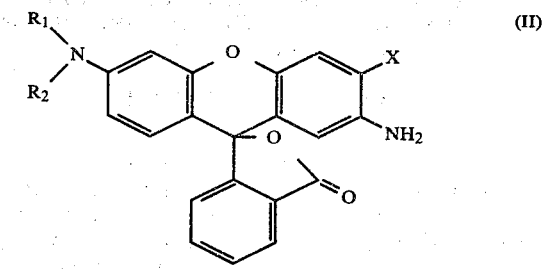

with an alkylating agent (III) represented by the general formula

$$R_3-Z \qquad (III)$$

In the above formulae, $R_1$ and $R_2$ each represents an alkyl group containing up to 18 carbon atoms, $R_3$ represents an alkyl group, a halogenated alkyl group, or an alkoxyalkyl group containing up to 18 carbon atoms, X represents a halogen atom, and Z represents a halogen atom, $R_3OSO_3$— or $R_4SO_3$—, wherein $R_4$ represents a phenyl group, a p-tolyl group or an alkyl group containing up to 5 carbon atoms.

The fluoran derivative (II) to be used as a starting material can be obtained by reacting 2-(4-dialkylamino-2-hydroxybenzoyl)benzoic acid with an aminophenol derivative in the presence of a condensing agent.

Then, this fluoran derivative (II) is reacted with the alkylating agent (III) in a suitable solvent, together with an additive, such as a base.

The process of the invention is particularly useful for preparing the fluoran derivatives of the general formula (I) wherein $R_3$ represents a halogen-substituted alkyl group or an alkoxy-substituted alkyl group.

Typical examples of the fluoran derivatives (II) that can be used as a starting material in the invention include 2-amino-3-chloro-6-diethylaminofluoran, 2-amino-3-chloro-6-dibutylaminofluoran, 2-amino-3-chloro-6-dimethylaminofluoran, 2-amino-3-chloro-6-diethylaminofluoran, 2-amino-3-chloro-6-dimethylaminofluoran, 2-amino-3-bromo-6-diethylaminofluoran, and so forth.

Preferred examples of alkylating agents that can be used in the invention include dimethyl sulfate, diethyl sulfate, butyl bromide, hexyl bromide, octyl iodide, 1-chloro-3-bromopropane, 2-ethoxyethyl p-toluenesulfonate, 2-phenyloxyethyl benzenesulfonate, and 2-butyloxyethyl methanesulfonate.

Examples of suitable ordinary organic solvents which can be used to carry out the process of the invention include methanol, ethanol, isopropanol, methyl cellosolve, ethyl cellosolve, benzene, toluene, xylene, dimethylformamide, acetone, methyl ethyl ketone, and the like.

Additives that can be used in the process of the invention include potassium carbonate, sodium carbonate, magnesium oxide, calcium oxide, triethylamine, potassium iodide, potassium bromide, sodium iodide, sodium bromide, tetrabutylammonium iodide, tetrabutylammonium bromide, and so forth. The purpose of the additive is various but the basic compound is usually added to remove the acid formed by the reaction.

The preferred alternative process of the invention can generally be practiced as follows: From about 1.0 to 10.0 mols of the alkylating agent is used per 1.0 mol of the fluoran derivative (II), preferably 1.0 to 3.5 mols of the alkylating agent, and they are reacted with each other in an organic solvent (in an amount from about 1 to 20 times by volume (in cc) the weight (in gm) of the fluoran derivative (II)) in the presence of the additive, at a temperature of from about 60° to 150° C. for from about 4 to 40 hours. After cooling, the reaction product is poured into water. Crystals, if formed, are collected by filtration, and, if no crystals are formed, the mixture is extracted with an organic solvent, followed by distillation of the solvent. Recrystallization of the residue from toluene, benzene, ethyl acetate, methanol, hexane, or the like results in a high yield of a fluoran compound represented by the formula (I).

Synthesis examples for synthesizing the foregoing fluoran derivatives (II) to be used as a starting material are shown below.

SYNTHESIS EXAMPLE 1

Synthesis of 2-amino-3-chloro-6-diethylaminofluoran 31.3 g of 2-(4-diethylamino-2-hydroxybenzoyl)benzoic acid was reacted with 18.6 g of 3-chloro-4-acetylaminophenol in the presence of 35 ml of 95% sulfuric acid and 35 ml of 20% fuming sulfuric acid at a temperature of 32° to 45° C. for 6 hours, and the thus obtained reaction product was poured into 350 ml of water. After stirring at 75° to 80° C. for 1 hour, a sodium hydroxide aqueous solution (prepared by dissolving 120 g of sodium hydroxide in 200 ml of water) was added thereto under cooling. Crystals thus formed were collected by filtration and washed with successive, dilute alkaline water, water, and methanol-water. Crystals thus formed were dried to obtain 36.8 g of dark violet 2-amino-3-chloro-6-diethylaminofluoran having a melting point of 190° to 194° C.

SYNTHESIS EXAMPLE 2

Synthesis of 2-amino-3-chloro-6-diethylaminofluoran 31.3 g of 2-(4-diethylamino-2-hydroxybenzoyl)benzoic acid was reacted with 22.7 g of o-acetyl-3-chloro-4-acetylaminophenol in the presence of 100 ml of 95% sulfuric acid at a temperature of 35° to 55° C. for 9 hours. Then, subsequent procedures were conducted in the same manner as in Synthesis Example 1 to obtain 35.0 g of dark violet 2-amino-3-chloro-6-diethylaminofluoran having a melting point of 190° to 194° C.

Preferred fluoran compounds for use according to the invention are those in which $R_1$ and $R_2$ represent an alkyl group containing up to 8 carbon atoms, and $R_3$ represents an unsubstituted or halogen- or alkoxy-substituted alkyl group containing up to 18 carbon atoms. Particularly preferable compounds are those in which $R_3$ is an alkyl, haloalkyl, or alkoxyalkyl group containing up to 8 carbon atoms.

Pressure-sensitive or heat-sensitive recording sheet using color former forms a pure black color that is stable with respect to light, temperature, and humidity, and can be economically produced. Color former of the formula (I) wherein $R_3$ represents an alkyl group containing up to 8 carbon atoms, and which may be optionally substituted by a halogen atom or an alkoxy group, causes extremely low fogging (that is, coloration of the recording sheet before use) upon production of heat-sensitive sheet, and thus is very preferable. These extremely excellent characteristics appear to result from a synergistic effect due to the introduction of halogen atom into 6-position and the introduction of monoalkyl-substituted amino group into 7-position. In the absence of either group, problems such as unsatisfactory color or insufficient light fastness (e.g., against sunlight) result.

Examples of the color formers that can be used in pressure- and heat-sensitive recording sheets according to the invention include:
(1) 2-methylamino-3-chloro-6-diethylaminofluoran
(2) 2-ethylamino-3-chloro-6-diethylaminofluoran
(3) 2-isopropylamino-3-chloro-6-diethylaminofluoran
(4) 2-(β-chloroethyl)amino-3-chloro-6-diethylaminofluoran
(5) 2-(γ-chloropropyl)amino-3-chloro-6-diethylaminofluoran
(6) 2-(β-ethoxyethyl)amino-3-chloro-6-diethylaminofluoran
(7) 2-octylamino-3-chloro-6-diethylaminofluoran
(8) 2-(2-ethylhexyl)amino-3-bromo-6-diethylaminofluoran
(9) 2-(γ-chloropropyl)amino-3-chloro-6-dibutylaminofluoran
(10) 2-(γ-fluoropropyl)amino-3-fluoro-6-dibutylaminofluoran
(11) 2-(β-ethoxyethyl)amino-3-chloro-6-dioctylaminofluoran
(12) 2-methylamino-3-chloro-6-didodecylaminofluoran
(13) 2-methylamino-3-chloro-6-distearylaminofluoran The foregoing list is merely exemplary, and the color formers are not limited to those described above.

Typical processes for preparing and using compounds according to the invention are exemplified below.

EXAMPLE 1

Process for preparing 2-γ-phenoxypropylamino-3-chloro-6-diethylaminofluoran 4.2 g of 2-amino-3-chloro-6-diethylaminofluoran and 5.0 g of γ-phenoxypropyl bromide were added to 10 ml of dimethylformamide, followed by further adding thereto 1.4 g of potassium carbonate. The resulting mixture was heated to 100° to 120° C. for 8 hours to react under stirring. Then, the reaction product was poured into 100 ml of water, and extracted with ethyl acetate. After distilling off ethyl acetate under reduced pressure, the residue was recrystallized from benzene-n-hexane to yield 2.7 g of almost colorless 2-γ-phenoxypropylamino-3-chloro-6-diethylaminofluoran having a melting point of 133° to 135° C.

A benzene solution of this fluoran compound was completely colorless and, when brought into contact with each of the three electron-accepting materials such as acid clay, zinc 3,5-di-t-butylsalicylate and bisphenol A, a black color was immediately formed.

EXAMPLE 2

Process for preparing 2-β-methoxyethylamino-3-chloro-6-diethylaminofluoran 4.2 g of 2-amino-3-chloro-6-diethylaminofluoran and 6.0 g of β-methoxyethyl bromide were added to 10 ml of dimethylformamide, followed by further adding thereto 1.4 g of potassium carbonate. The resulting mixture was heated to 70° to 90° C. for 16 hours to react under stirring. After allowing to cool, the reaction mixture was treated in the same manner as in Example 1 to yield 2.5 g of almost colorless 2-β-methoxyethylamino- 3-chloro-6-diethylaminofluoran having a melting point of 208° to 210° C.

When brought into contact with electron-accepting materials such as described in Example 1, this fluoran compound immediately formed a black color.

EXAMPLE 3

Process for preparing 2-β-isobutyloxyethylamino-3-chloro-6-diethylaminofluoran 4.2 g of 2-amino-3-chloro-6-diethylaminofluoran and 4.2 g of β-isobutyloxyethyl bromide were added to 10 ml of toluene, followed by further adding thereto 1.4 g of potassium carbonate. The resulting mixture was heated to 110° C. for 20 hours to react under stirring. Then, subsequent procedures were conducted in the same manner as in Example 1 to yield 3.1 g of almost colorless 2-β-isobutyloxyethylamino-3-chloro-6-diethylaminofluoran having a melting point of 144° to 146° C.

When brought into contact with electron-accepting materials as in Example 1, this fluoran compound immediately formed a black color.

EXAMPLE 4

Process for preparing 2-β-butyloxyethylamino-3-chloro-6-diethylaminofluoran 4.2 g of 2-amino-3-chloro-6-diethylaminofluoran and 5.4 g of β-butyloxyethyl bromide were added to 10 ml of methyl ethyl ketone, followed by further adding 1.4 g of potassium carbonate. The resulting mixture was heated to 80° to 90° C. for 40 hours to react under stirring. Then, subsequent procedures were conducted in the same manner as in Example 1 to yield 3.0 g of almost colorless 2-β-butyloxyethylamino-3-chloro-6-diethylaminofluoran having a melting point of 114° to 116° C.

When brought into contact with electron-accepting materials as in Example 1, this fluoran compound immediately formed a black color.

EXAMPLE 5

Process for preparing 2-β-ethoxyethylamino-3-chloro-6-diethylaminofluoran 4.2 g of 2-amino-3-chloro-6-diethylaminofluoran and 8.5 g of 2-ethoxyethyl p-toluenesulfonate were added to 8.4 ml of ethyl cellosolve, followed by further adding thereto 0.6 g of magnesium oxide, 0.7 g of sodium iodide, and 0.5 g of triethylamine. The resulting mixture was heated to 110° C. for 10 hours to react. Then, the reaction product was poured into 80 ml of water, and crystals thus formed were collected by filtration. Recrystallization of the thus obtained crude product from toluene.methanol yielded 3.8 g of almost colorless 2-β-ethoxyethylamino-3-chloro-6-diethylaminofluoran having a melting point of 188° to 190° C.

When brought into contact with electron-accepting materials as in Example 1, this fluoran compound immediately formed a black color.

EXAMPLE 6

Process for preparing 2-β-phenoxyethylamino-3-chloro-6-diethylaminofluoran 4.2 g of 2-amino-3-chloro-6-diethylaminofluoran and 10 g of β-phenoxyethyl methanesulfonate were added to 10 ml of ethanol, followed by further adding thereto 1.4 g of potassium carbonate. This mixture was refluxed by heating for 30 hours to react under stirring. Then, subsequent procedures were conducted in the same manner as in Example 1 to yield 2.6 g of almost colorless 2-β-phenoxyethylamino-3-chloro-6-diethylaminofluoran having a melting point of 229° to 231° C.

When brought into contact with an electron-accepting materials as in Example 1, this fluoran compound immediately formed a black color.

EXAMPLE 7

Process for preparing 2-γ-chloropropylamino-3-chloro-6-diethylaminofluoran 4.2 g of 2-amino-3-chloro-6-diethylaminofluoran and 14 g of 1-chloro-3-bromopropane were added to 8 ml of isopropyl alcohol, followed by further adding thereto 0.4 g of magnesium oxide. This mixture was refluxed for 15 hours to react by heating under stirring. Then, subsequent procedures were conducted in the same manner as in Example 5 to yield 3.1 g of almost colorless 2-γ-chloropropylamino-3-chloro-6-diethylaminofluoran having a melting point of 158° to 160° C.

When brought into contact with electron-accepting materials as in Example 1, this fluoran compound immediately formed a black color.

EXAMPLE 8

Process for preparing 2-β-chloroethylamino-3-chloro-6-diethylaminofluoran 4.2 g of 2-amino-3-chloro-6-diethylaminofluoran and 4.2 g of 1-chloro-2-bromoethane were added to 10 ml of ethanol, followed by further adding thereto 0.3 g of calcium oxide. The resulting mixture was refluxed for 30 hours to react by heating under stirring. Then, subsequent procedures were conducted in the same manner as in Example 5 to yield 2.5 g of almost colorless 2-β-chloroethylamino-3-chloro-6-diethylaminofluoran having a melting point of 149° to 151° C.

When brought into contact with electron-accepting materials as in Example 1, this fluoran compound immediately formed a black color.

EXAMPLE 9

Process for preparing 2-butylamino-3-chloro-6-diethylaminofluoran 4.2 g of 2-amino-3-chloro-6-diethylaminofluoran and 6.5 g of butyl p-toluenesulfonate were added to 9 ml of ethyl cellosolve, followed by further adding thereto 0.6 g of magnesium oxide, 0.8 g of potassium iodide, and 0.3 g of tetrabutylammonium iodide. The resulting mixture was heated to 110° C. for 27 hours to react. Then, subsequent procedures were conducted in the same manner as in Example 5 to obtain 3.2 g of almost colorless 2-butylamino-3-chloro-6-diethylaminofluoran having a melting point of 152° to 154° C.

When brought into contact with electron-accepting materials as in Example 1, this fluoran compound immediately formed a black color.

EXAMPLE 10

Process for preparing 2-hexylamino-3-chloro-6-diethylaminofluoran 4.2 g of 2-amino-3-chloro-6-diethylaminofluoran and 16.0 g of hexyl bromide were added to 10 ml of dimethylformamide, followed by adding thereto 1.4 g of potassium carbonate. The resulting mixture was heated to 110° C. for 10 hours to react under stirring. Then, subsequent procedures were conducted in the same manner as in Example 1 to yield 3.0 g of almost colorless 2-hexylamino-3-chloro-6-diethylaminofluoran having a melting point of 190° to 191° C.

When brought into contact with electron-accepting materials as in Example 1, this fluoran compound immediately formed a black color.

Comparative Examples for the synthesis according to the foregoing reaction formula (A) will be described below.

COMPARATIVE EXAMPLE 1

Synthesis of 2-$\beta$-butyloxyethylamino-3-chloro-6-diethylaminofluoran 3.1 g of 2-(4-diethylamino-2-hydroxybenzoyl)benzoic acid and 2.4 g of 3-chloro-4-$\beta$-butyloxyethylaminophenol were added to 10 ml of 95% sulfuric acid, and the resulting mixture was heated to 65° C. for 10 hours to react under stirring.

The reaction product was poured into 50 ml of water, and a sodium hydroxide aqueous solution (prepared by dissolving 12 g of sodium hydroxide in 20 ml of water) was added thereto. After extraction with ethyl acetate, ethyl acetate was distilled off under reduced pressure. Recrystallization of the residue from benzene-n-hexane yielded 0.4 g of the same compound as obtained in Example 7.

COMPARATIVE EXAMPLE 2

Synthesis of 2-$\beta$-ethoxyethylamino-3-chloro-6-diethylaminofluoran 3.1 g of 2-(4-diethylamino-2-hydroxybenzoyl)benzoic acid and 2.2 g of 3-chloro-4-$\beta$-ethoxyethylaminophenol were added to 5 ml of 95% sulfuric acid and 5 ml of 20% fuming sulfuric acid, and this mixture was heated to 18° to 35° C. for 30 hours to react under stirring. Then, subsequent procedures were conducted in the same manner as in Comparative Example 1 to yield 1.6 g of the same compound as obtained in Example 8.

COMPARATIVE EXAMPLE 3

Synthesis of 2-$\gamma$-chloropropylamino-3-chloro-6-diethylaminofluoran 3.1 g of 2-(4-diethylamino-2-hydroxybenzoyl)benzoic acid and 2.3 g of 3-chloro-4-$\gamma$-chloropropylaminoanisole were added to 5 ml of 95% sulfuric acid and 5 ml of 20% fuming sulfuric acid, and this mixture was heated to 30° C. for 6 hours to react under stirring, followed by heating to 100° C. for 7 hours to react under stirring.

Then, subsequent procedures were conducted in the same manner as in Comparative Example 1 to yield 1.8 g of the same compound as obtained in Example 10.

COMPARATIVE EXAMPLE 4

Synthesis of 2-$\gamma$-chloropropylamino-3-chloro-6-diethylaminofluoran 3.1 g of 2-(4-diethylamino-2-hydroxybenzoyl)benzoic acid and 2.2 g of 3-chloro-4-$\gamma$-chloropropylaminophenol were added to 4 ml of 95% sulfuric acid and 3 ml of 30% fuming sulfuric acid, and the resulting mixture was heated to 40° to 45° C. for 6 hours to react.

Then, subsequent procedures were conducted in the same manner as in Comparative Example 1 to yield 2.0 g of the same compound as obtained in Example 10.

As is clear from the above results for the Comparative Examples, the process of the present invention is found to be extremely advantageous.

Because of their advantageous properties as are shown in the foregoing Examples, fluoran compounds having the formula (I) prepared according to the process of the present invention can be advantageously used as compositions for forming color images (particularly black) in pressure- and heat-sensitive recording sheets. Thus such compositions consist essentially of at least one, and may include more than one, fluoran compound having the formula (I).

A pressure-sensitive recording sheet according to the invention can be produced as follows (e.g., by the representative method as described in U.S. Pat. Nos. 3,418,250 and 4,147,830): The color former or, if desired, two or more color formers, is (are) dissolved in a solvent such as alkylated naphthalene, alkylated diphenyl, alkylated diphenylalkane, chlorinated paraffin, or the like. The resulting oil containing the dissolved color former is emulsified to a particle size of several microns in an aqueous solution containing an emulsifier, a protective colloid, then encapsulated with gelatin, polyurethane, polyurea, or the like. The purpose of the protective colloid is to stabilize the emulsion. To the resulting microcapsules are added, if necessary or desired, a binder, an additive, and the mixture is coated on a support such as paper, synthetic resin film, or the like to form an upper sheet. Examples of the additive are stilt material such as starch ball, flock, and the like.

Colored developers that can be used in the sheet include clay minerals (e.g., active clay, kaolin, attapulgite, etc.), phenol derivatives (e.g., p-phenylphenol, p-tert-butylphenol, 2,2-bis(p-hydroxyphenyl)propane, etc.), phenol resins (e.g., phenol-formalin condensate, etc.), aromatic carboxylic acids or polyvalent metal salts of aromatic carboxylic acids, etc.

Of the above-described color developers, phenol derivatives are particularly useful for heat-sensitive recording paper, and polyvalent metal salts of aromatic carboxylic acids are particularly useful for pressure-sensitive recording paper.

Polyvalent metal salts of aromatic carboxylic acids are described, for example, in U.S. Pat. Nos. 3,864,146, 3,983,292, 3,934,070, 3,983,292, and in Japanese Patent Application No. 25158/78.

Polyvalent metal salts of aromatic carboxylic acids having a hydroxy group in the o- or p-position with respect to the carboxy group are useful. Salicylic acid is particularly preferred. In addition, those having a substituent such as an alkyl group, an aryl group, an aralkyl group, or the like in at least one of the o- and p-positions (with respect to the hydroxy group) and which have at least 8 carbon atoms in the substituent or substituents are preferable.

Particularly preferable examples of the aromatic carboxylic acids include 3,5-di-t-butylsalicylic acid, 3,5-di-t-amylsalicylic acid, 3,5-bis(α,α-dimethylbenzyl)salicylic acid, 3,5-bis(α-methylbenzyl)salicylic acid, 3-(α-methylbenzyl)-5-(α,α-dimethylbenzyl)salicylic acid, 3,5-di-t-octylsalicylic acid, and 3-cyclohexyl-5-(α,α-dimethylbenzyl)salicylic acid.

Metals that can be used for forming salts with the above-described aromatic carboxylic acids include magnesium, aluminum, calcium, scandium, titanium, vanadium, chromium, manganese, iron, cobalt, nickel, copper, zinc, gallium, germanium, strontium, yttrium, zirconium, molybdenum, cadmium, indium, tin, antimony, barium, tungsten, lead, bismuth, and so forth. Of these metals, zinc, tin, aluminum, manganese, and calcium are particularly preferred. The most preferred metal among these is zinc.

The color developer is either dispersed in a dispersing medium using a ball mill, sand mill, homogenizer, or the like, or dissolved in a solvent and, if necessary, a binder, an additive, etc., are added thereto, then the resulting mixture is coated onto a support to form a lower sheet.

The desirable properties for a color former to be used in a pressure-sensitive recording sheet are as follows: (1) it should have a high solubility (the amount (g) of the color former dissolved based on 100 g of the oil) for a color former-dissolving oil (solubility of at least 5 being desirable); (2) it should not form color during an encapsulation step; (3) it should form an intended color on the color developer; (4) it and color body formed therefrom should be stable under conditions of ambient temperature and humidity and against irradiation with light (such as sunlight); and (5) it should be economical to prepare.

The color former of the present invention represented by the formula (I) is very satisfactory with respect to these desired properties, and overcomes defects, for example: (1) insufficient solubility for a color former-dissolving oil which has been encountered with some conventionally known black color formers such as 3-ethyltolylamino-6-methyl-7-anilinofluoran (described in Japanese Patent Application (OPI) No. 19517/75 (the term "OPI" as used herein refers to a "published unexamined Japanese patent application"); and (2) insufficient light fastness, which has been encountered, for example, with 3-piperidino-6-methyl-7-anilinofluoran (described in Japanese Patent Application (OPI) No. 9430/75) and 3-diethylamino-6-chloro-7-benzylaminofluoran (described in Japanese Patent Publication No. 34044/74). From the standpoint of the production costs, while most of conventionally known fluoran-type black color formers have a methyl group at the 6-position of the formula (I) (thus requiring comparatively expensive 3-methyl-4-anilinophenol to be used as a starting material therefor), the color former of the formula (I) according to the invention is prepared from a comparatively inexpensive 3-halo-4-alkylaminophenol derivative.

A heat-sensitive recording sheet according to the invention can be produced as follows: The color former and the color developer are separately dispersed in dispersing medium containing dissolved therein a binder. After mixing the resulting dispersions with each other and, if necessary, adding thereto additives such as a pigment or wax, the mixture is coated on a support and dried. The representative method for preparing of the heat-sensitive recording sheet is disclosed in U.S. Pat. Nos. 2,939,009 and 3,451,338. The thus produced heat-sensitive recording sheet contains the color former and the color developer in the same layer, and hence coloration reaction may occur to some extent even before use under certain temperature and humidity conditions. This phenomenon is called fogging. The possibility of fogging depends greatly upon the structure of the color former, and it has been found that color former represented by the formula (I) of the present invention causes less fogging, and is thus preferable.

The color former of the formula (I) wherein $R_3$ represents an alkyl group containing 2 to 8 carbon atoms (optionally substituted by a halogen atom or an alkoxy group) causes less fogging, and is thus particularly desirable.

Furthermore, color former for heat-sensitive recording sheets must not result in significant coloration of background areas due to irradiation with light, such as sunlight, and are required to form color bodies which do not disappear due to changes in temperature, humidity, or irradiation with light. From these viewpoints, too, the compounds of the formula (I) are excellent.

The present invention will now be further described in detail by reference to further examples, which show pressure-sensitive and heat-sensitive recording sheets according to the invention. In the following examples, parts are all by weight.

EXAMPLE 11

Pressure-Sensitive Sheet (1) Preparation of upper paper:

Each of the color formers of the present invention shown in Table 1 was dissolved in diisopropylnaphthalene at about 60° C. to adjust the concentration to 6.0%. Every color former was completely dissolved rapidly. 6 parts of acid-processed gelatin having an isoelectric point of pH 7.8 and 6 parts of gum arabic were dissolved in 40 parts of water, and 0.1 part of Turkey red oil was dropwise added thereto. The formerly prepared color former solution was gradually poured thereinto under vigorous stirring to form an o/w emulsion. Then, 180 parts of 40° C. warm water was added thereto, and the pH was adjusted to 4.6 by adding 10% acetic acid. The solution temperature was lowered to 10° C., and a mixture of 0.8 part of a 25% glutaraldehyde aqueous solution and 0.2 part of a 37% formaldehyde aqueous solution was added thereto. Further, 20 parts of a 10% carboxymethyl cellulose sodium salt aqueous solution was added thereto, and the pH of the solution was adjusted to 10.0 by adding a 10% sodium hydroxide aqueous solution. Then, the solution temperature was raised to 50° C., followed by stirring for several ten minutes. Average drop size upon emulsification was 6.5 μm. The resulting solution was coated on a high quality paper having a basis weight of 40 g/m² in a dry solid amount of 3 g/m² to obtain upper sheets for pressure-sensitive recording papers (Samples 1 to 5).

(2) Preparation of lower paper:

6 parts of a 20% sodium hydroxide aqueous solution was added to 150 parts of water, and 50 parts by weight of active clay was gradually added thereto to disperse under stirring. Further, 20 parts of a 48% styrene-butadiene rubber latex was added thereto, and the resulting mixture was coated on a high quality paper having a basis weight of 40 g/m² in a dry solid amount of 8 g/m² to obtain lower paper for pressure-sensitive recording paper.

The above-described upper paper and the lower paper were superposed one over the other, and a pressure of 600 kgW/cm² was applied thereto to form color. For the purpose of examining light fastness of the formed color body, the samples were left for 10 hours under 32,000 lux fluorescent lamp light, and the density before and after the irradiation was measured using a Macbeth RD-514 reflection densitometer (using a visual filter) to determine the ratio of the density after the test to the density before the test. The higher values indicate superior properties. Also, for the purpose of confirming sunlight fastness of the color former, the microcapsule-coated surface of upper paper was irradiated with 32,000 lux fluorescent lamp light for 10 hours in the same manner to measure the color density. In this case the lower values indicate the superior properties. Results thus obtained are tabulated in Table 1.

COMPARATIVE EXAMPLE 5

3-Diethylamino-6-methyl-7-anilinofluoran, known as a black color former, was encapsulated and an upper sheet (Comparative Sample 1) was prepared in the same manner as in Example 11. This comparative sample was tested in the same manner as in Example 11. Results thus obtained are also shown in Table 1.

EXAMPLE 12

Heat-Sensitive Sheet 1 part of the color former shown in Table 2 and 5 parts of a 5% polyvinyl alcohol (saponification degree: 98%; polymerization degree: 500) were dispersed for one day and one night using a ball mill. Further, 5 parts of 2,2-bis(p-hydroxyphenyl)propane and 25 parts of a 5% polyvinyl alcohol aqueous solution were similarly dispersed for one day and one night using a ball mill. The resulting dispersion was mixed with the color former dispersion, and coated on a high quality paper having a basis weight of 50 g/m² in a dry amount (solid) of 4 g/m², followed by drying at about 50° C. to prepare heat-sensitive recording papers (Samples 6 to 10).

For the purpose of testing storage stability of the thus obtained heat-sensitive recording papers, they were stored for one week under an atmosphere of 50° C. and 80% RH to measure the degree of fogging through visual density. Also, for the purpose of confirming light fastness, density of the samples after being irradiated with 32,000 lux fluorescent lamp light for 10 hours was measured. The smaller the value, the better the sample.

For the purpose of examining fastness of the color former, a 150° C. stamp was applied thereto for 1 second with a pressure of 500 g/cm² to form color. After storing for one week in an atmosphere of 50° C. and 80% RH, the density was measured to determine the ratio of remaining color body. Also, density was similarly measured after irradiating the sample for 10 hours with 32,000 lux fluorescent lamp light to determine the ratio of remaining color body. The greater these values, the better the sample. Results thus obtained are tabulated in Table 2.

COMPARATIVE EXAMPLE 6

In a manner analogous to Example 12 except for using as a color former 2-anilino-3-methyl-6-diethylaminofluoran, 2-anilino-3-methyl-6-piperidinofluoran or 2-benzylamino-3-chloro-6-diethylaminofluoran, heat-sensitive recording papers were prepared (Comparative Samples 2 to 4) to compare. Results thus obtained are shown in Table 2.

The results shown in Table 1 indicate that the pressure-sensitive recording sheets of the present invention have excellent storage stability and fastness.

The results given in Table 2 show that the heat-sensitive recording sheets of the present invention cause less fogging and show excellent storage stability and fastness.

TABLE 1

| Color Former | Hue | Light Resistance of Color Body (1) | Light Resistance of Capsule-Coated Surface (2) |
| --- | --- | --- | --- |
| Sample 1 (present invention) $C_2H_5$–N($C_2H_5$)–[structure with O, Cl, $NHC_6H_{13}(n)$, CO] | Black | 86% | 0.08 |
| Sample 2 (present invention) | | | |

TABLE 1-continued

| Color Former | Hue | Light Resistance of Color Body (1) | Light Resistance of Capsule-Coated Surface (2) |
|---|---|---|---|
| 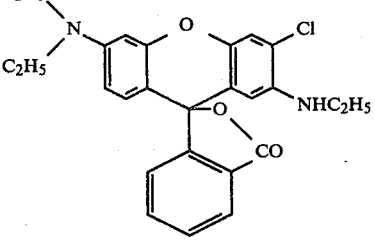 | Black | 97% | 0.11 |
| Sample 3 (present invention)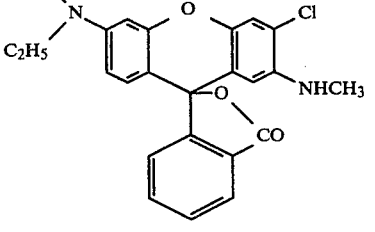 | Black | 92% | 0.11 |
| Sample 4 (present invention)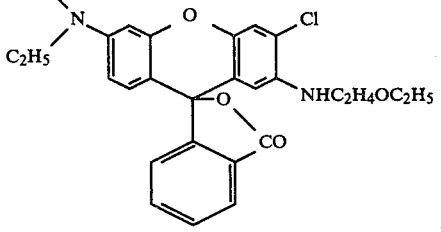 | Black | 80% | 0.09 |
| Sample 5 (present invention)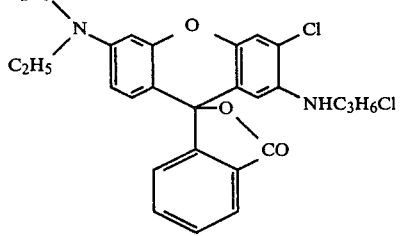 | Black | 79% | 0.08 |
| Comparative Sample 1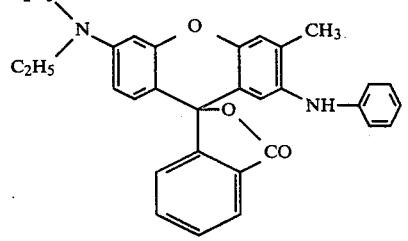 | Red-Black | 76% | 0.14 |

(1) Ratio of color density of color body measured after irradiation with 32,000 lux light for 10 hours to that measured before the irradiation.
(2) Color density of the microcapsule-coated surface of the upper paper measured after irradiation with 32,000 lux light for 10 hours.

TABLE 2

| Color Former | (1) | (2) | (3) | (4) | Hue |
|---|---|---|---|---|---|
| Sample 6 (present invention) [structure: diethylamino-xanthene with Cl and NHC$_4$H$_9$(i) substituents] | 0.07 | 0.08 | 100% | 98% | Black |
| Sample 7 (present invention) [structure: diethylamino-xanthene with Cl and NHC$_2$H$_4$Cl substituents] | 0.07 | 0.07 | 98% | 100% | Black |
| Sample 8 (present invention) [structure: diethylamino-xanthene with Cl and NHC$_3$H$_6$Cl substituents] | 0.06 | 0.07 | 96% | 100% | Black |
| Sample 9 (present invention) [structure: diethylamino-xanthene with Cl and NHC$_2$H$_4$OC$_2$H$_5$ substituents] | 0.07 | 0.06 | 100% | 97% | Black |
| Sample 10 (present invention) [structure: diethylamino-xanthene with Cl and NHC$_2$H$_4$OC$_3$H$_7$ substituents] | 0.08 | 0.07 | 97% | 98% | Black |

Comparative Sample 2

TABLE 2-continued

| Color Former | (1) | (2) | (3) | (4) | Hue |
|---|---|---|---|---|---|
| 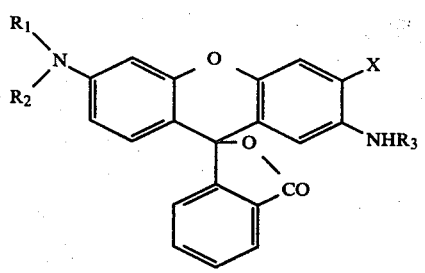 | 0.18 | 0.11 | 98% | 100% | Black |
| Comparative Sample 3 | 0.09 | 0.16 | 95% | 92% | Black |
| Comparative Sample 4 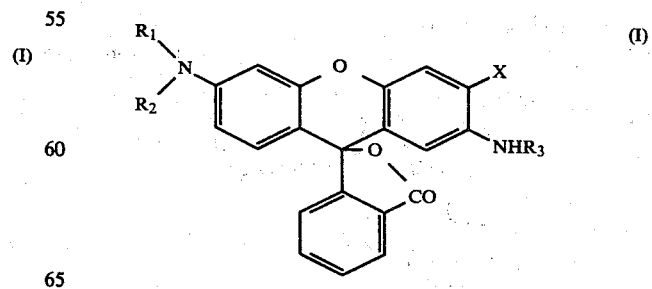 | 0.09 | 0.21 | 97% | 81% | Black |

(1) Storage stability of uncolored heat-sensitive recording paper under the conditions of high temperature and high humidity: Color density of uncolored heat-sensitive recording paper measured after storing at 50° C. and 80% RH for one week.
(2) Light resistance of uncolored heat-sensitive recording paper: Color density of uncolored heat-sensitive recording paper measured after irradiating the recording surface of the heat-sensitive paper with 32,000 lux fluorescent lamp light for 10 hours.
(3) Temperature and humidity resistance of color body: Ratio of color density of colored paper measured after being stored at 50° C. and 80% RH for one week to that measured before the storage.
(4) Light resistance of color body: Ratio of color density of colored paper measured after being irradiated with 32,000 lux fluorescent lamp light for 10 hours to that measured before the irradiation.

While the invention has been described in detail and with reference to specific embodiments thereof, it will be apparent to one skilled in the art that various changes and modifications can be made therein without departing from the spirit and scope thereof.

What is claimed is:

1. A pressure-sensitive recording sheet comprising a support carrying as a color former microcapsules containing a fluoran compound represented by the formula (I)

wherein $R_1$ and $R_2$ each represents an alkyl group containing up to 18 carbon atoms, $R_3$ represents an unsubstituted alkyl group, a halogenated alkyl group, or an alkoxyalkyl group containing up to 18 carbon atoms, and X represents a halogen atom.

2. A heat-sensitive recording sheet comprising a support carrying as a color former in a binder a fluoran compound represented by the formula (I)

wherein $R_1$ and $R_2$ each represents an alkyl group containing up to 18 carbon atoms, $R_3$ represents an unsubstituted alkyl group, a halogenated alkyl group, or an alkoxyalkyl group containing up to 18 carbon atoms, and X represents a halogen atom.

3. A pressure- or heat-sensitive recording sheet as in claim 1 or claim 2, wherein said color former comprises a fluoran compound according to formula (I) wherein $R_3$ is an unsubstituted alkyl, haloalkyl, or alkoxyalkyl group containing up to 8 carbon atoms.

4. A pressure- or heat-sensitive recording sheet as in claim 1 or claim 2, wherein said color former is a fluoran compound selected from the group consisting of 2-γ-phenoxypropylamino-3-chloro-6-diethylaminofluoran, 2-β-methoxyethylamino-3-chloro-6-diethylaminofluoran, 2-β-isobutyloxyethylamino-3-chloro-6-diethylaminofluoran, 2-β-butyloxyethylamino-3-chloro-6-diethylaminofluoran, 2-β-ethoxyethylamino-3-chloro-6-diethylaminofluoran, 2-β-phenoxyethylamino-3-chloro-6-diethylaminofluoran, 2-γ-chloropropylamino-3-chloro-6-diethylaminofluoran, 2-β-chloroethylamino-3-chloro-6-diethylaminofluoran, 2-butylamino-3-chloro-6-diethylaminofluoran, 2-hexylamino-3-chloro-6-diethylaminofluoran, 2-hexylamino-3-chloro-6-diethylaminofluoran, 2-ethylamino-3-chloro-6-diethylaminofluoran, 2-isopropylamino-3-chloro-6-diethylaminofluoran, 2-(β-chloroethyl)amino-3-chloro-6-diethylaminofluoran, 2-(γ-chloropropyl)amino-3-chloro-6-dimethyl-aminofluoran, 2-(β-ethoxyethyl)amino-3-chloro-6-diethyl-aminofluoran, 2-octylamino-3-fluoro-6-diethylaminofluoran, 2-(2-ethylhexyl)amino-3-bromo-6-diethylaminofluoran, 2-(γ-chloropropyl)amino-3-chloro-6-dibutylaminofluoran, 2-(γ-fluoropropyl)amino-3-fluoro-6-dibutylaminofluoran, 2-(β-ethoxyethyl)amino-3-chloro-6-dioctylaminofluoran and 2-methylamino-3-chloro-6-diethylaminofluoran.

* * * * *